(12) United States Patent
Steels (10) Patent No.: US 7,440,927 B2
(45) Date of Patent: Oct. 21, 2008

(54) REGULATING THE GROWTH OF COMPLEXITY IN DEVELOPMENTAL SYSTEMS

(75) Inventor: Luc Steels, Paris (FR)

(73) Assignee: Sony France S.A., Clichy la Garenne (FR)

( * ) Notice: Subject to any disclaimer, the term of this patent is extended or adjusted under 35 U.S.C. 154(b) by 381 days.

(21) Appl. No.: 10/886,453

(22) Filed: Jul. 7, 2004

(65) Prior Publication Data

US 2005/0010542 A1    Jan. 13, 2005

(30) Foreign Application Priority Data

Jul. 9, 2003    (EP)    ................... 03291714

(51) Int. Cl.
*G06F 15/18*    (2006.01)

(52) U.S. Cl. .................. 706/12; 706/14; 706/15

(58) Field of Classification Search .................. 706/16, 706/25
See application file for complete search history.

(56) References Cited

U.S. PATENT DOCUMENTS 6,516,350 B1 *    2/2003    Lumelsky et al. ........... 709/226

OTHER PUBLICATIONS

Kishan Mehrotra et al, Elements of Artificial Neural Networks, 1997, MIT.*
Humberto E. Garcia, Reconfigurable Control of Power Plants Using Learning Automata, Jan. 1991, IEEE, 0272-1708/91/0100-0085, 85-92□□.*
"Environmental complexity control for vision-based learning mobile robot" by Uchibe et al., from the Proceedings of the 1998 IEEE International Conference on Robotics and Automation (Leuven, Belgium, May 16-20, 1998), published by IEEE, New York, NY, USA, 1998, pp. 1865-1870.
"On the Interplay between morphological, neural and environmental dynamics: A robotic case study" by M. Lungarella and L. Berthouze, Adaptive Behaviour (on-line), vol. 1, No. 3-4, Jul. 1, 2002 retrieved from URL http://staff.aist.go.jp/luc.berthouze/papers/2003/ab03.pdf.
"Learning and development in neural networks: the importance of starting small" by J. Elman in "Cognition", vol. 48, No. 1, (Jul. 1, 1993), pp. 71-99.
"Developing Haptic and Visual Perceptual Categories for Reaching and Grasping with a Humanoid Robot" by Jefferson A. Coelho et al., from "Robotics and Autonomous Systems", soecial issue on humanoid robots, vol. 37, No. 2-3, pp. 195-215, 2001.

(Continued)

*Primary Examiner*—Joseph P Hirl
(74) *Attorney, Agent, or Firm*—Oblon, Spivak, McClelland, Maier & Neustadt, P.C.

(57) ABSTRACT

Developmental systems (1/11) are provided with an autotelic mechanism for driving their development. An autotelic component (1) in the system uses a mapping mechanism (2) to produce an output based on a set of inputs. The mapping mechanism (2) implements a mapping that is dependent upon a state associated therewith. The content of the state is changed by a learning/repair module (3) based on interactions between the system and the environment, and so reflects knowledge gained by this component as a result of its experience. The autotelic component (1) monitors its own performance with reference to the level of a set of one or more challenge parameters whose levels quantify the complexity of different parameters relating to the autotelic component (1). The state associated with the mapping mechanism 2 is altered depending upon the component's performance as evaluated during the monitoring. A controller (5) controls the levels of the challenge parameters.

27 Claims, 4 Drawing Sheets

OTHER PUBLICATIONS

"Emergent Adaptive Lexicons" by L. Steels, in the Proceedings of the 4th International Conference on Simulation of Adaptive Behavior, "From Animals to Animats", ed. P. Maes, The MIT Press, Cambridge Ma., 1996.

"Autonomous mental development by robots and animals" by J. Weng, J. McClelland, A. Pentland, O. Sporns, I. Stockman, M. Sur, & E. Thelen, in Science, 291, 599-600, 2001.

"Structures, inner values, hierarchies and stages: Essentials for developmental robot architectures" by A. Kulakov & G. Stojanov, in the Proceedings of the Second International Workshop on Epigenetic Robotics: Modeling Cognitive Development in Robotic Systems, ed. C.G. Prince et al., Lund University Cognitive Studies, Lund, Sweden (2002), vol. 94, pp. 63-69.

"Optimization by Simulated Annealing" by S. Kirkpatrick, C.D. Gerlatt Jr., and M.P. Vecchi, in "Science" 220, 671-680, (1983).

"Simulated annealing: Practice versus theroy" by L. Ingber in "Mathematical and Computer Modelling", 18, 11, 29-57, (1993).

"Shared grounding of event descriptions by autonomous robots" by L. Steels and J-C Baillie, Robotics and Autonomous Systems, 43 (2003), pp. 163-173

"A constructivist model of infant cognition" by L. Cohen et al., in Cognitive Development, 17(2002) 1323-1343, (2002).

Chapter 1 of "Rethinking Innateness: A connectionist perspective on development" by J. L. Elman et al., MIT Press, Cambridge, Ma., USA (1996).

"Specialization of Neural Mechanisms Underlying Face Recognition in Human Infants" by Michelle de Haan, Oliver Pascalis, and Mark H. Johnson, *Journal of Cognitive Neuroscience*. 2002;14:199-209.

"Cortical specialization for higher cognitive functions: Beyond the maturational model" by M.H. Johnson, Brain and Cognition, 42, 124-127, (1996).

A brief history of connectionism by D. Medler. Neural Computing Surveys, vol. 1, p. 18-72).

"Neural Networks for Pattern Recognition" by C.M. Bischop, Oxford University Press, Oxford, UK, 1995.

"Development as a dynamic system". By Thelen and L. Smith, vol. 7, 8, p. 343-348, 2003.

"A dynamic systems approach to the development of cognition and action" by B. Thelen and L. Smith, MIT Press, Cambridge Ma., 1996.

"Flow—A theory of optimal experience: History and Critical Evaluation". By Walter John Carl, Theories of Communication, Rochester Institute of Technology, NY, USA, 1994 but not formally published—available on the Internet since an unknown date—see http://www.atsweb.neu.edu/w.carl/PDFS/flowpaper.pdf.

"Optimal Experience: Psychological Studies of Flow in Consciousness" ed. M. Csikszentmihalyi and I. Selega, Cambridge University Press, Cambridge, 2001, and "Beyond Boredom and Anxiety: Experiencing Flow in Work and Play" by M. Csikszentmihalyi, Cambridge University Press, Cambridge, 1978.

* cited by examiner

REGULATING THE GROWTH OF COMPLEXITY IN DEVELOPMENTAL SYSTEMS

The present invention relates to the field of artificial intelligence and robotics and, more particularly, to the regulation of the developmental process in self-developing systems.

In the present document, the expression "developmental systems", or "self-developing systems" refers to systems which develop themselves, by interaction with the environment (both external and internal to the system), so as to increase their competence and/or knowledge.

The design and implementation of developmental systems, capable of open-ended development has become a focal point of recent efforts in robotics and artificial intelligence (AI) research (see "Autonomous mental development by robots and animals" by J. Weng, J. McClelland, A. Pentland, O. Sporns, I. Stockman, M. Sur, & E. Thelen, in Science, 291, 599-600, 2001; and "Structures, inner values, hierarchies and stages: Essentials for developmental robot architectures" by A. Kulakov & G. Stojanov, in the Proceedings of the Second International Workshop on Epigenetic Robotics: Modeling Cognitive Development in Robotic Systems, ed. C. G. Prince et al, Lund University Cognitive Studies Volume 94, Lund, Sweden (2002)) and also in the new field of evolutionary linguistics. It is also being studied by developmental psychologists, often in the context of 'epigenetic' or 'ontogenetic' development (see "Rethinking innateness: A connectionist perspective on development" by J. L. Elman et al, MIT Press, Cambridge, Mass., USA (1996), and "Cortical specialization in infants: Beyond the maturational model" by M. H. Johnson, Brain and Cognition, 42, 124-127, (1996)) because the growth of intelligence in infants, as described by Piaget and others, shows clearly that human beings exhibit open-ended development.

Building developmental systems obviously requires many problems to be solved, particularly in the case of a system which includes subcomponents handling respective sub-tasks. Consider a set of components which all form part of a larger system to accomplish a complex task interacting with an environment. It can be considered that each component of the system performs a particular input-output mapping, in other words, for a given set of inputs that component will produce a corresponding output (which may change as this component, and the system as a whole, develops). Typically, components are chained in the sense that output from one component acts as input to one or more of the others. Such a multi-component system is fully "developmental" if each component of the system is adaptive (in the sense that it has the capacity for building up the competence required for the subtask for which it is responsible). Moreover it is desirable for the system to be able to cope with new components or instantiations of generic components being introduced or 'coming on line' any time, since this leads to an open-ended development. For example, it is desirable that artificial systems should have a "combinatorial" capability as illustrated by the following example of the developmental behaviour of infants: infants learn to reach for objects and, independently, to open/close their hands in a grasping movement, but once both capabilities are acquired these can be combined in a total gesture so as to be able to reach and grab an object.

Open-ended development obviously requires learning and the ability to recruit additional resources, such as memory or processing power, as required in order to achieve a task. Most forms of learning require feedback on how 'correct' the mapping is which is established by a component. "Correct" means that it contributes to the good functioning of the total system. This feedback might be generated by other components or by the system's success in achieving the global task.

An example of the type of multi-component system concerned is the sensori-motor system of a robot, which has components for segmentation of sensori-motor streams generated in interaction with the environment, for feature extraction, for tracking, for object identification and recognition, for event detection and event recognition, for goal generation, for planning, for fine-grained motor control for grasping, for forward movement, for navigation, etc. It is now generally accepted that each of these components should be adaptive because of the open-ended nature of the real world: with a strictly task-oriented design there is a risk that the system's potentialities and functions would be unduly constrained.

In this example, consider what is involved in grasping an object. This task requires that the object is categorised to see how it should be grasped. These categories must be gradually learned through interaction with the environment, and success in grasping provides feedback on how good the existing categorisations are. Many learning systems are already available in the art. For example, the required categorisation could be done by a standard feed-forward perceptron-like neural network that performs a weighted sum of the (visual) inputs, in which case learning could be achieved by a change in weights based on feedback (see "Neural Networks for Pattern Recognition" by C. M. Bischop, Oxford University Press, Oxford., 1995).

Another example of a multi-component system is a natural language system for an autonomous robot, which has components for topic selection, conceptualisation, lexicon lookup, grammar rule application, rendering into speech, parsing, semantic interpretation, dialog management, etc. It is again widely accepted that, for best performance, each of these components must be adaptive, due to the open-ended nature of natural language.

In this case, and to take just one example, the lexical component must be capable of learning the meaning of new words. This can be achieved, for example, by associative learning based on guessing the meaning of unknown words and on feedback on whether a certain word was successful in a particular communication (see "Emergent Adaptive Lexicons" by L. Steels, in the Proceedings of the Simulation of Adaptive Behavior Conference, ed. P. Maes, The MIT Press, Cambridge Mass., 1996).

Figure 1:
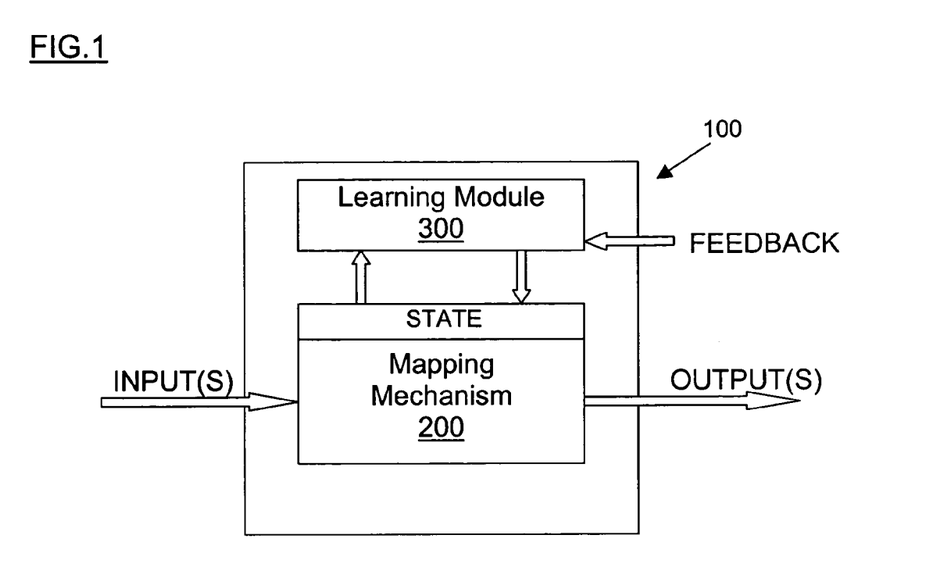
FIG. 1 is a block diagram schematically representing the main components of a self-developing component.

As illustrated schematically in FIG. 1, a self-developing component 100 includes some kind of mapping mechanism 200 which processes inputs in order to produce an output or, more rarely, plural outputs. The nature of the mapping mechanism depends upon the application: it can consist of an algorithm computing a function from inputs to output, a neural network which is given a set of inputs and settles into an output state, a physical controller, etc. The mapping mechanism can be implemented in a variety of ways: for example, a neural network will typically have a set of connections between input and output nodes and a table of weights for each link; a physical controller may have a software component which influences how the mapping is carried out; etc.

In order to perform the desired mapping, the mapping mechanism 200 makes use of a representation of information (or "knowledge") the form of which depends upon the application. This representation of information is modified based on the system's experience gained by interactions with the environment (considered in a general sense so as to include both elements external to the system and internal system elements).

This representation of information is shown in FIG. 1 as a state associated with the mapping mechanism 200. This state will be better understood from a consideration of two examples.

The first example is rather artificial but simplifies understanding: consider a mapping mechanism 200 which implements a telephone directory function. This mapping mechanism receives a name as an input and yields a telephone number as an output. The state associated with this mapping mechanism is a mapping relating names to telephone numbers (implemented, for example, using a database). If the mapping operation fails, typically because there is no entry listed for a particular input name, then this database (state) can be updated so as to add a <name-telephone number> entry for the name in question. The mapping mechanism 200 will now make use of the updated state when performing its mapping operation.

A more realistic example concerns a robotic device equipped with a vision system and a mechanism for grasping objects, this grasping mechanism including a robot arm and a hand with multiple fingers. The device views a scene and applies visual feature detectors (which specify conditions which must be fulfilled by certain parameters in order for it to be considered that specific visual features have been detected within the viewed scene). The best position and shape of the robot hand in order to grasp a given object depends upon the shape of that object, which is reflected in its visual features. The robotic device includes a component which seeks to learn relationships between sets of visual features detectors and corresponding target positions for the robot arm, hand and fingers. See, in this connection, "Developing Haptic and Visual Perceptual Categories for Reaching and Grasping with a Humanoid Robot" by Jefferson A. Coelho et al, from "Robotics and Autonomous Systems", special issue on humanoid robots, 37(2-3), pp.195-218, 2001.

In the above example, the input to this self-developing component is a set of visual parameter data, the output from the component is a set of target position data for the robot arm, hand and fingers. In this case, the state represents the set of visual feature detectors and their parameters, and the associations between the visual features and target positions of the arm, hand and fingers. A failure signal is produced when the hand is unable to grasp an object, which implies that the categorization implicit in the current state is incorrect. The robot will go on to try different possibilities and, eventually, will manage to grasp this particular object. New specific visual features relating to this object can then be learned and related to the arm, hand and finger trajectories that were successful.

The self-developing component 100 also includes a learning module 300 which is the element which monitors the state associated with the mapping mechanism 200 and changes this state with the aim of ensuring that the mapping performed by the mapping mechanism approaches more and more closely to the desired mapping. The learning module 300 changes the state of the mapping mechanism 200 based on feedback, typically from components external to the self-developing component 100. This feedback may, for example, indicate that another component which co-operates with the self-developing component 100 has been unable to perform its allocated task, or, that the overall task associated with the whole system has failed. Internal feedback may also be provided to the learning module 300 from within the self-developing component 100 itself.

For example, in the case where the mapping mechanism 200 implements an algorithm based on a look-up table, when the algorithm fails an outside information source (for example, a human user) provides the appropriate output so that a new input-output relation can be stored, thereby updating the state. In the case where the mapping mechanism 200 is implemented using a neural network (e.g. a perceptron network or back-propagation network), there are well-known rules concerning how a feedback signal should cause the network to learn. Specifically, the learning module 300 changes the weights of the links in the network, thereby updating the state, until an adequate input-output mapping is established by the mapping mechanism 200. In the case where the mapping mechanism 200 is implemented as a physical controller, the learning module 300 can form part of the controller's software and be programmed to optimize the controller in the future, thereby updating the state, based on feedback signals received as the controller operates.

Although the building of developmental systems, particularly multi-component systems, requires many problems to be solved, there is a global problem: how can the increase in complexity of such a developmental system be managed? In other words, how can it be ensured that there is a progressive build up of skills, leading to an increased complexity in the tasks, behaviors, and input-output mappings that can be handled by the artificial system?

The problem of regulating development is very challenging for a number of reasons:

(1) Certain things often cannot be learned before other things are mastered, so the developmental complexity must be scaffolded somehow, to bootstrap from simple to complex. Thus, in a language-based system it is not possible to apply or learn grammar if there is not a minimal knowledge about the lexicon. Similarly, in a robotic system, it is not possible to perform fine-grained control of grasping if there is no ability to identify and track the objects that need to be grasped.

(2) In a complex multi-component system, each component depends on others, either to provide input or to produce appropriate feedback. Particularly if there are many sub-components, each developing at its own pace, it becomes very difficult to regulate the overall development in the system.

(3) A final challenge is that the process of development should be actively encouraged. Once a stable plateau of performance is reached, there should be a motivating force to push complexity further, even if this means a decreased performance in the short-term.

Special challenges arise in the case of a multi-agent system, such as a collection of autonomous robots which have to cooperate with each other. Each agent is independently learning and adapting to the environment but, in order to enable cooperation between agents, they have to coordinate their learning effort. For example, if two robots cooperate in a physical task, one robot cannot rely on the other one to achieve tasks it cannot yet perform or, if there is communication between two robots, one robot cannot use communication conventions which are still to be learned by the other. So the development of each individual must somehow be calibrated with the development of other members of the group.

Initially researchers have proposed that nothing special needs to be done to organise growth in complexity in developmental systems because the development of one skill will naturally create new opportunities for the development of other skills in a changing ontogenetic landscape (see "A dynamic systems approach to cognition and development" by B. Thelen and L. Smith, MIT Press, Cambridge Mass., 1994). For example, once it has been learned how to control an arm, then it is possible to start exploring uses of the hand provided at the end of that arm. Although this is undoubtedly the case, it is now recognised that more needs to be done, especially so as to avoid the case where the system remains in stable states which do not fully exploit its full capacity. Specifically, three approaches have been discussed to this problem in the scientific literature.

Scaling of Input Complexity

A first group of researchers have proposed that development can be organized by regulating the complexity of external inputs given to the system. In this way the system is hypothesised to be able to build up capacity in a scaffolded way. In practice, a small subtask is usually isolated and the system is trained for that specific subtask with prepared scaffolded data. For example, the above-mentioned robotic device which grasps objects is first trained using very simple geometrically-straightforward objects (see the above-cited work by Coelho et al) before presenting it with objects having the kind of complexity that is encountered in the real world. (For other examples see "A constructivist model of infant cognition" by L. Cohen et. al, in Cognitive Development, 17(2002) 1323-1343, (2002); and "Learning and development in neural networks" by J. Elman in Cognition 48 (1993), pages 71-99). In more sophisticated applications, several stages and subcompetences are identified and input data is carefully prepared to pull the developmental system through each stage.

Scaling of Resources

Some researchers have shown that by gradually introducing greater resources to a system it is possible to scale learning and thus shown a developmental staging. For example, Elman (1993) (op cit.) has shown that a language processing system implemented using recurrent neural networks with relatively fewer memory resources, layers or links between layers can first build up competence in learning simple grammatical constructions before these resources are increased so as to enable the system to tackle more complex grammatical constructions.

Scaffolding of Reward Function

Other researchers have proposed to scaffold the tasks that the system addresses by scaffolding a reward function which is used by the system for reinforcing certain behaviours or discouraging others, i.e. to give external feedback to the developmental system which makes sure that simpler and foundational skills are learned before more complex skills are tackled. (see "Autonomous mental development by robots and animals" op. cit.). In the case of language development for example, we could envision first rewards for producing single word sentences, then for multiple-word sentences, then for constructing grammatical phrases with increased complexity. In the case of reaching and grasping by a robot arm, there could first be rewards for orienting the arm in the direction of the target object, then rewards for touching the object and enclosing it with fingers, and then rewards for picking up and displacing the object.

All these approaches are valuable and have been shown to yield interesting results. Moreover, they are not completely devoid of naturalness because, in the case of infants, caregivers often scaffold the environment or "up the ante" in order to push the infant to achieve higher competence. However, these approaches assume a very strong intervention by 'trainers' and/or a careful a priori design of developmental scenarios. The real world always presents itself with the same complexity to the learner and it is therefore artificial to constrain it. Knowing in advance how to limit system resources so as to achieve scaffolded learning is an unsolved problem and, in any case, implies interference at a low level with a system as it is developing. It would be much more desirable if a system could develop independently and autonomously in an open-ended environment by actively self-regulating its own development.

The present invention seeks to provide a system which can develop independently and autonomously in an open-ended environment by actively self-regulating its own development.

The preferred embodiments of the present invention provide a general principle by which a complex developmental system can self-regulate its build up of skill without the need for the intervention of the designer in scaffolding of the environment, progressive introduction of resources, or staging external reward functions. This principle provides a powerful new regulatory force. The other approaches (i.e. simplification of inputs, scaling of reward functions or progressive introduction of resources by external intervention) are not excluded: they can be combined with the new principle.

The present invention involves autotelic regulation of the development of complexity in a developmental system. "Autotelic" signifies that the motivational driving force ("telos") comes from the system itself ("auto"). The invention takes inspiration from the results of empirical investigations into human motivation, particularly those focusing on internal motivation (see "Optimal Experience: Psychological Studies of Flow in Consciousness" ed. M. Csikszentmihalyi and I. Selega, Cambridge University Press, Cambridge, 2001). These investigations have led to the development of the so-called "flow theory" (see "Beyond Boredom and Anxiety: Experiencing Flow in Work and Play" by M. Csikszentmihalyi, Cambridge University Press, Cambridge, 1978).

Figure 2:
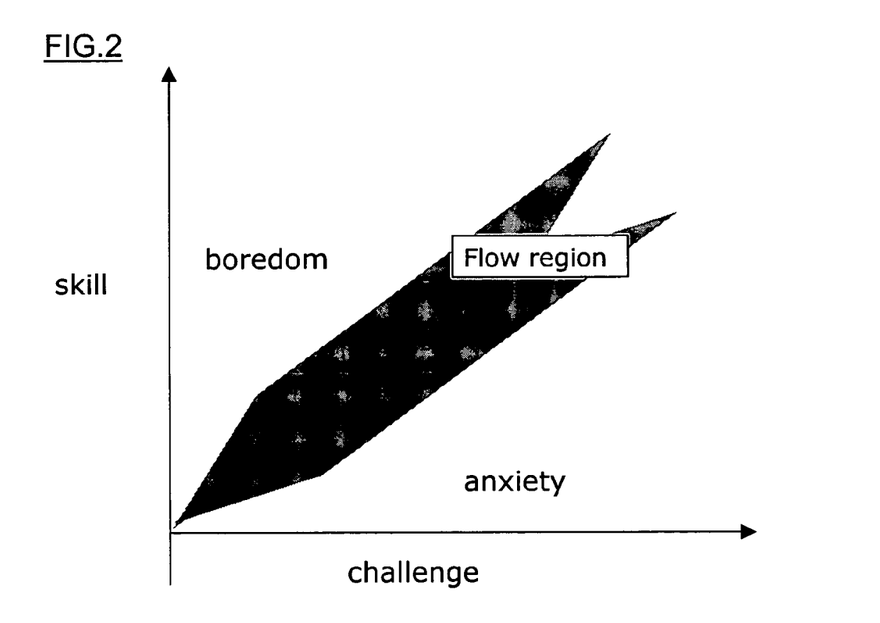
FIG. 2 is a graph schematically illustrating the effect of the changing balance of skill and challenge levels according to "flow theory"

According to "flow theory", human beings are highly motivated when there is a balance between the challenge with which they are faced and the skill they possess for addressing that challenge (see FIG. 2). When the level of challenge is too low and the person's skill level is too high there is the experience of boredom, whereas if the challenge is too high for the level of skill, there is an experience of anxiety. The balance state (represented by the "flow region" in FIG. 2) gives a strong positive reward (a feeling of well-being and accomplishment) and hence human beings seek to replicate the behavior that leads to this state. Because a person's skill generally increases during the execution of a task, a particular task which may have been challenging initially will, at some point, become boring, requiring the person actively to seek a more challenging task. We call the principle by which human beings self-regulate their challenge and task levels the autotelic principle (following "Beyond Boredom and Anxiety: Experiencing Flow in Work and Play" op. cit.). The present invention applies this "autotelic" principle as the foundation for regulating complexity growth in artificial (i.e. non-natural) developmental systems.

The present invention renders the autotelic principle operational and embodies it in developmental systems, for example, in developmental robotics devices, developmental language systems, etc. It can be considered that an "autotelic device" is a self-developing device with the characteristics of self-monitoring and self-regulation of challenge parameters.

More particularly, the present invention provides an artificial system comprising at least one self-developing component, wherein the process of development of said at least one component is driven by a requirement to achieve a performance level which matches a changeable level of challenge set by the system itself.

It is to be understood that the present invention may be applied in a developmental system which has only one adaptive (self-developing) component, or in a multi-component developmental system in which some or all of the components are adaptive. Further, the present invention can also be applied in systems comprising a plurality of autonomous agents (each agent being a self-developing device).

Preferably, in an artificial system embodying the present invention the at least one autotelic component has a mapping mechanism which applies a mapping function to a set of one or more inputs in order to produce one or more outputs, and the system comprises: a controller for regulating the level of challenge presented to the autotelic component, performance monitoring means for monitoring, during each of a series of time intervals, the performance of said autotelic component with reference to at least one level of challenge set by said controller, and a learning module for adapting the mapping function applied by the autotelic component, based on the performance monitored by the performance monitoring means, whereby to attempt to match the performance of the autotelic component to the level of challenge.

Advantageously, the "level of challenge" is represented using a set of one or more challenge parameters ($<p_1, p_2, \ldots, P_n>$) defined for each autotelic component, respectively, the value of each challenge parameter (p) being indicative of a level of complexity, and the controller sets values for each of the challenge parameters within a respective range 0.0 to 1.0, with 1.0 representing the greatest level of complexity.

According to the present invention the balancing of skill and challenge is the fundamental motivational driving force of a developmental system. This means that the system should be parameterised so that challenge levels can be self-adjusted (increased or decreased, as appropriate) based on self-monitoring of performance, and must have a learning subsystem which can increase skill in order to cope with a new level of challenge. The increase in complexity of the system's behavior (and hence the kinds of tasks and environmental complexity it can handle) is an emergent side effect of the system's effort to keep a balance between challenge and skill.

The challenge parameters co-determine the mapping implemented by the mapping mechanism of an autotelic component according to the invention, and they co-determine the feedback signal received by the component. Often, they will also co-determine the parameters which quantify the component's performance ("performance measures"). Many of the performance measures are directly related to how well the challenges that were set have been achieved, and the feedback signal is also related to the challenge level. For example, in an autotelic object-tracking component, if the challenge level indicates that two objects need to be tracked but only one can reliably be followed then a failure signal will be produced.

It could be hypothesized that there would be a conflict arising from a difference between the actual complexity of the input to an autotelic component and the level of complexity of the input as indicated by a challenge parameter (for example, in a case where the actual input is very complex whereas a corresponding challenge parameter relating to the input specifies a low challenge level). In practice, this does not cause a problem. Consider, for example, the case of a system where the input is a speech signal, which is highly complex, whereas an associated challenge parameter may specify a low level of complexity. The system focuses on those portions of the speech that can be recognized, ignoring all the rest. Indeed, a challenge parameter can be defined for this system indicating what percentage of the speech signal should be covered. The state can be a set of speech-templates that can be matched against the input. Similarly, in a template-based vision system, the system can simply search for those portions of the image that it can cope with, ignoring all other detail. Yet further, in a component which parses language utterances, the component can initially process just those words that it can recognize, ignoring unrecognized words and grammar.

According to preferred embodiments of the invention, when the performance monitoring means detects a difference, greater than a threshold amount, between the level of challenge and the actual performance of an autotelic component, then a failure signal is generated. As a result, the learning module of this component implements a set of one or more repairs (if any are available) selected from a list of candidate repairs. It has been found to be advantageous to filter out from the list of candidate repairs any repairs which have previously been tried unsuccessfully for this component, and to implement one repair at a time then restart application of the mapping function by this component, preferably using the same set of input stimuli as that which gave rise to generation of the failure signal. There can also be other sources of the failure signal, notably other components within the system.

According to the preferred embodiments of the invention, the self-regulation of challenge levels involves an operation phase and a shake-up phase, which alternate. At startup, the challenge parameter levels are advantageously set to the lowest values. During the operation phase, the values of the challenge parameters are clamped. During each instance of the shake-up phase, the controller selects and alters the value of a set of one or more (preferably one, or a small number) of the challenge parameters. The system preferably changes over from operation phase to shake-up phase functioning when the performance levels of the autotelic component(s) in the system have reached a steady-state and there is no significant increase in skill levels.

In the case of a multi-component system, it is advantageous for the balancing of skill and challenge to be the driving force both at the level of the total system and at the level of each of the adaptive components. This means (1) that each component must be parameterized, (2) that each component must have a learning subsystem, and (3) that there is a global dynamic regulating the adjustment (both increase and decrease) of challenge levels for the system as a whole. The reward function of the total system is based on the degree of balance between challenge and skill for each of the components.

Developmental systems according to the present invention may be composed entirely of software implemented on a suitable general purpose computer, or can be implemented in hardware or a mixture of hardware and software.

The above and other features and advantages of the present invention will become more apparent from the following description of preferred embodiments thereof, given by way of example, and illustrated in the appended drawings, in which.

The following description first provides more detail on certain aspects of the invention, namely the parameterization of components, the monitoring of performance, learning and skill levels, and the regulation of challenge levels. Then there is a treatment of simplified examples of developmental systems in which the invention is implemented: this includes information on a simple system having just one component that uses the autotelic principle as a drive to development, and a multi-component system in which each component makes use of the autotelic principle. It is to be understood that the invention can also be applied in multi-component systems wherein some, but not all, components (or modules) make use of the autotelic principle to drive development.

Parameterisation of Components

For each adaptive (or "developmental") component of the system, one or more parameters must be defined such that the parameter value(s) reflects different challenge levels faced by this component. The nature of the parameterisation obviously depends on the task that the component must achieve and on the nature of the algorithms that are used within that component.

Consider the example of a robotic system having a vision sub-system and a hand-eye sub-system. Suppose there is a component in this robotic system that has the task of moving an object, this component will make use of the vision sub-system and the hand/arm sub-system. One parameterisation of such a component could concern the precision with which the object is to be moved: is pushing it aside in a broad gesture enough, or should the object be picked up and put down carefully in a precise location. A "precision of positioning" parameter would take a value (typically, within a specified continuous range) indicating the level of precision which is required. Another "challenge parameter" could be the nature of the object: is it of a simple uniform shape or does it contain handles or other structures that need to be recognised and used to manipulate the object? An "object complexity" parameter would take a value (within a specified range) indicating the level of complexity of the object. Another challenge parameter could indicate the weight of the object (a heavy weight might require the robot to take a specific position so as not to get out of balance).

A given component $c_i$ may have n of these challenge parameters p defined in relation to it. Formally, we associate with each component $c_i$ a parameter vector $<p_{\{i,1\}}, \ldots, p_{\{i,n\}}>$ indicating the values of each of the n challenge parameters. The set of all challenge parameters for all m components in a multi-component system defines a multi-dimensional parameter space P. Advantageously, challenge parameters are designed to take values in the range [0,1] (that is, from 0 to 1) to make the global dynamics easily implementable. At any point, t, in time, a system s adopts a particular configuration of these challenge parameters p(s,t) within the parameter space P. In a multi-agent system, the agents may have respective different challenge-parameter configurations.

The problem of self-regulation in development can now be seen as a search process in a multi-dimensional parameter space until optimal (or acceptable) performance is reached. The performance is evaluated using a cost function, C: P→R, where R is a real number between 0.0 and 1.0. Formally, the goal is to find a configuration p(s,t) such that $C(p(s,t))=C_{opt}$, where $C_{opt}$ is the optimum cost. In the case of a multi-agent system, the goal is to find a configuration such that for all s, $C(p(s,t))=C_{opt}$.

Typically, the parameter space involved in any realistic developmental system will be very large, such that the problem is an NP-hard (i.e. nondeterministic polynomial time-hard) problem as defined according to complexity theory. In order to solve this problem it will generally be necessary to make approximations, accept sub-optimal performance and use heuristics.

The process of searching within the parameter space for a set of parameter values which yields optimum performance (evaluated in terms of the cost function) can be carried out using techniques that are known from optimization theory, such as: the Simplex algorithm, combinatorial optimization, simulated annealing, evolutionary programming, etc. These techniques are well-known in the field of optimization theory (see, for example, "Combinatorial Optimization: Algorithms and Complexity" by C. H. Papadimitriou and K. Steiglitz, Dover, N.Y., 1998) and so further detail will not be included here. Now, according to the present invention the goal of the developmental system is not to reach a stable state, but to keep exploring the parameter landscape so as to maintain a balance of challenge and skill. In other words, as soon as a stable state is reached there are forces to pull the system out of equilibrium again. This is explained in greater detail in the section below headed "Self-Regulation".

Monitoring Performance (The Cost Function)

Each component has the necessary submodule(s) to monitor its own performance. There is also at least one submodule monitoring the performance of the system as a whole. Various types of performance measures (or "monitor variables") can be formulated, but it is preferred that they are designed to yield a value in the range [0,1] with 1 being optimal performance for a specific performance measure.

At the component level, there can be various performance measures related to the nature of the task that the component is trying to achieve. For example, a component in a natural language production system concerned with lexicon lookup can monitor how far it can cover all the meanings that must be expressed, and to what extent the words that were chosen have been understood by the hearer. In a system where objects are being grasped, performance measures for reaching and grasping performance can collect data on characteristics such as: the energy expended, the length of the trajectories followed, the fluidity of the movement, the number of times backtracking was required, and the speed with which a movement could be executed.

The optimal levels for these performance measures must be defined, and they are often related to the challenge parameters defined for this component. For example, in the above-mentioned "lexicon lookup" component, there could be challenge parameters such as "the ratio between the number of words used and the number of predicates covered" (higher values of this challenge parameter causing the system to create words with complex meanings), or "the certainty with which a certain word has a certain meaning" (higher values of this challenge parameter causing the system to seek disambiguated words as much as possible). The value of the corresponding performance measure reflects how far actual performance deviates from the desired performance level indicated by the challenge parameter. At the simplest, for a given challenge parameter $p_{ij}$, and related actual performance $a_{ij}$, the corresponding performance measure, $m_{ij}$, can be given by:

$$m_{ij}=1-|p_{ij}-a_{ij}|.$$

At the level of the system considered as a whole, once again the performance measure(s) are related to how well the system is achieving the overall task(s) it is addressing.

Formally, with each component $c_i$, and with the total system $c_T$, there is a respective associated monitor vector $<m_{\{i,1\}}, \ldots, m_{\{i,q\}}>$.

Performance data is collected over a certain window of time, known as the observation window, and values are typically averaged and compared to desired performance during this period.

The set of monitor variables (performance measures) for all the components in the system, together with the monitor variables defined for the overall system itself, define a multi-dimensional space, and global system performance in response to a given stream of environmental stimuli traces a trajectory in this space. Preferably, the performance M(s,t) of the total system s at a time, t, is quantified by calculating the average of the values of all monitor variables (that is, those of all components used in the system and those of the overall system itself). The Cost function, C(P(s,t)), can then be defined as follows:

$$C(P(s,t)) = 1.0 - M(s,t)$$

And the optimal value of the Cost function, $C_{opt}$, is 0.0.

It will be seen that the above-described variable M(s,t) representing the performance of the total system s at a time, t, preferably is evaluated taking into account not just performance measures relating to how well the total system is performing its assigned task(s) but also performance measures relating to how well each component is achieving its assigned sub-task(s). This ensures that, if the system is under-performing, the component(s) which are under-performing can affect the choice of any remedial or developmental steps to be taken.

Incidentally, depending upon the application, it can be desirable for M(s,t) to be based on a weighted average of the performance measures. Some challenges can be of a very basic nature such that they should be maintained at all times (so performance measures associated with these challenge parameters would have a high weight when calculating M(s,t)), whereas other challenges, although representing desirable competences, are not so crucial (and the associated performance measures can be assigned lower weights when calculating M(s,t)).

Learning and Skill Levels

In a developmental system, a component which uses the autotelic principle as the drive for development, according to the present invention, includes means for increasing its own skill level. This skill-increasing means (or "repair means") is typically used when a particular input-output mapping cannot be established by this component, or when a failure signal is received indicating that the input-output mapping was incorrect or not performed in accordance with the challenge levels specified in the challenge parameters.

In the case of a multi-component developmental system in which the components and the global system apply the autotelic principle, when the global system is attempting to establish its global input-output mapping by chaining the mappings of each of its sub-components, various failures can occur. Moreover, even if a mapping can be established it may require change because of generation of a failure signal later on. Taking the example of a natural language system, once again, the lexicon component may not have words for certain predicates, so that only part of a semantic structure could be covered. Or, in a system of communicating autonomous agents, the lexicon of one agent may differ from that of another to the extent that there is a failure in communication. Thus, once again, the components are provided with means for repairing failures/increasing skill level.

The present invention is not limited with regard to the kind of method which can be used for increasing the skill level/repairing failures. Suitable techniques include, but are not limited to: methods which "increase skill" by increasing the resources being used by the component (for example, which increase the memory available to the component), simple learning mechanisms (such as various forms of neural networks), sophisticated symbolic machine learning techniques, etc.

It is useful to formalise the characteristics of the skill level of the developing system, in order to track what is going on. This can be achieved by defining "skill variables" for the component. Examples of such skill variables include: the amount of memory required by the component (use of a lower amount of memory representing a higher skill level), the number of rules learned by the component, the number of nodes or links in a network, etc. These skill variables can be quantified so that their evolution can be followed during the development of the component. Therefore, a component $c_i$ has an associated skill vector $<s_{\{i,1\}}, \ldots, s_{\{i,r\}}>$ which measures skill levels.

From the above, it follows that a component $c_i$ according to the present invention is preferably defined as a triple $c_i = <P_{\{i,j\}}, M_{\{i,k\}}, S_{\{i,l\}}>$, where $P_{\{i,j\}} = <p_{\{i,1\}}, \ldots p_{\{i,n\}}>$ is the challenge parameter vector, $M_{\{i,k\}} = <m_{\{i,1\}}, \ldots, m_{\{i,q\}}>$, is the monitor vector (or, "vector of performance measures") and $S_{\{i,l\}} = <s_{\{i,1\}}, \ldots, s_{\{i,r\}}>$ is the skill vector. Advantageously, in a multi-component system, the total system T is also defined as a component having its own parameters, monitors, and skill measures, so that performance for the system as a whole can be monitored as well.

Self-Regulation

Developmental systems according to the present invention are designed to regulate the levels of the challenge parameters with the aim of achieving smooth, progressive self-development.

The process of finding the optimum setting for the challenge parameters is an instance of combinatorial optimization, and so has the same general structure as well-known optimisation algorithms such as simulated annealing in which a configuration of parameters needs to be found which gives optimal performance (see "Optimization by Simulated Annealing" by S. Kirkpatrick, C. D. Gerlatt Jr., and M. P. Vecchi, in "Science" 220, 671-680, (1983)). Simulated annealing is inspired by statistical physics, specifically the slow cooling process in which a solid reaches a minimal energy state with a highly regular structure. It has been generalised to be a general optimisation process which uses stochastic variation to avoid local minima (see "Simulated annealing: Practice versus theory" by L. Ingber in "Mathematical and Computer Modelling", 18, 11, 29-57, (1993)).

However, in the present invention there are two complications compared to traditional optimisation tasks: (1) the "cost" of a particular configuration of challenge parameters cannot simply be computed by applying a simple function (in contrast to the "travelling salesman" problem, for example, where the "cost" of the salesman following a particular path is, basically, the length of a path) but must be derived from monitoring actual performance of the system over a particular period of time, and (2) this monitoring period must include enough time for the system to acquire the necessary skills to reach a certain performance level. It is to be noted that the objective is not to get optimal performance, but rather to explore the landscape of possibilities in such a way that a higher degree of complexity is reached.

Optimization algorithms typically combine iterated improvement (in which there are small-scale changes to a configuration in order to find optimal parameter settings in a hill-climbing process), and randomization (in which there is a change in a parameter which may initially cause a decrease in performance but helps the system to get out of a local minimum). Both of these aspects are present in the algorithms proposed here for self-regulating the challenge parameters.

Figure 3:
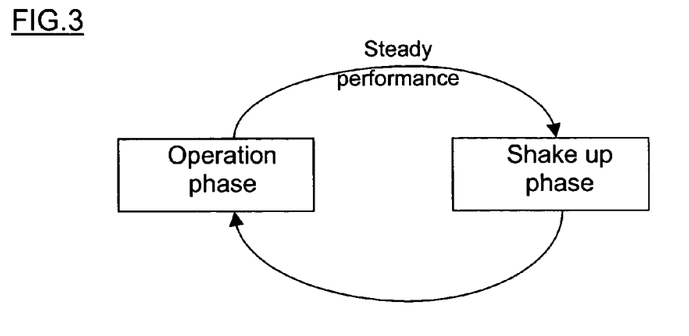
FIG. 3 is a diagram schematically indicating phases in the self-regulation of development that are implemented by a self-developing system according to the preferred embodiment of the present invention.

According to the preferred embodiment of the invention, the process of regulating the challenge parameters has two alternating phases (see FIG. 3):

(1) an "operation phase", in which challenge parameters are clamped until a steady performance level is reached after increases in skill levels through learning or resource allocation; and (2) a "shake-up phase", in which the challenge parameters are changed (either because a steady performance was reached and the acquired skill level is getting too high for the challenge posed, or because desired performance could not be reached even after attempts to improve skill and so the challenge level is too high for the acquired skill level).

According to the preferred embodiments of the present invention, the cost function for a given configuration of challenge parameters in the system is computed by taking the average of the performance monitors, because if the functions computing these monitors have the form explained earlier, their average provides a straightforward measure of how well the total system is behaving.

Instead of starting with a random configuration, it has been found to be preferable that the system should start with the lowest challenge levels possible for all components, so as to build up competence steadily in a bottom-up fashion. In order to cater for the situation where the system is switched off (or otherwise loses power) after it has already started acquiring competence, the controller which sets the challenge parameter values within the system can either store the "current" configuration in non-volatile memory or can verify whether or not the system truly is "starting-up" before it sets the challenge parameter values to their lowest levels. This verification can be performed by checking the skill levels of the various components.

In the case of a multi-agent system with uneven skills, the more able agent (the agent with best performance) should keep decreasing its challenge parameters (even if skill is already at a high level) so as to give the other(s) the chance of catching up.

Operation Phase

During the operation phase the challenge parameters are clamped at certain levels. The system must exercise its components and monitor the performance of each. A component becomes active when its various inputs are available. In the case where there are failures (either because the component could not achieve a desired input-output mapping or because a failure signal has been received, typically from another component), the relevant component can make use of the repair means available to it in order to fix the failure. For example, in a sensori-motor system designed to grasp objects, if a grasp action failed, the system can be designed such that the categorisation component of the system receives a failure signal and must extend its categorial repertoire in order to distinguish a new situation. Some of the repairs just involve the addition of additional resources, such as more memory or more processing cycles. Because there are many possible failures in a given run and many possible repairs, some choice must be made about which repairs will be tried and how many.

Preferred Procedure for the Operation Phase

Figure 4:
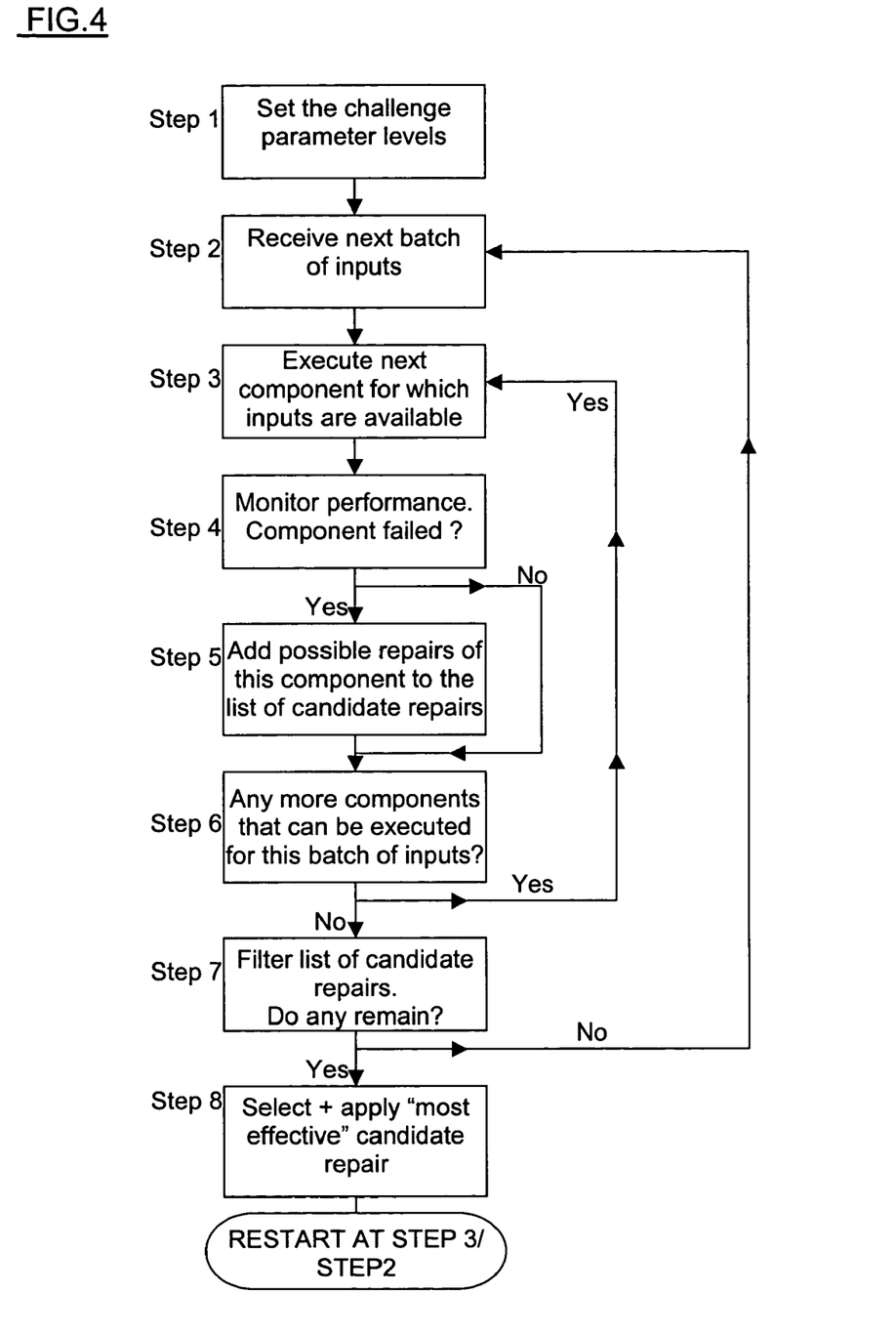
FIG. 4 is a flow diagram indicating the main steps involved in the "operation phase" according to one preferred embodiment of the invention.

The operation phase can be organised as indicated in the flow diagram of FIG. 4. This flow diagram and the accompanying description correspond to the case of a self-developing system including more than one developmental component. The description notes where the steps would be different for a system including a single developmental component.

With the levels of the challenge parameters fixed (step 1), the next batch of input stimuli is received by the system (step 2). It is then established which components have available to them all their required inputs (or, for a system including a single developmental component, it is checked whether or not this component has available its required inputs). The first of these components for which inputs are available is then executed (step 3) and its performance is monitored. The performance monitoring evaluates whether the desired input-output mapping can be established and to what extent the performance satisfies the criteria set by the current challenge parameters (step 4). If the input-output mapping cannot be established, or the difference between the actual performance of the component and the performance indicated by the set challenge parameter value is too great (as evaluated by comparing this difference against a threshold amount), then a failure signal is generated. [Note that failure may sometimes only be detected at a later stage when other components have attempted to deal with the output of this component.]

If the component fails, a set of possible repairs for this component is derived and added to a list of "candidate repairs" (step 5). Typically, data will be stored in the system in a register or memory (either at the component level or the system level) indicating the set of possible repairs for a given component. It is advantageous to add heuristics by giving the repairs a ranking in terms of potential effectiveness for handling the problem. This ranking can be different depending upon the nature of the component's failure. Data on the rankings of possible repairs are generally programmed into the system. However, it is possible to make these rankings adaptive such that they change as the system "learns". Moreover it is necessary to take into account which repairs have already been tried on the same input-output mapping, in order to avoid getting stuck in an infinite loop in which the same repair (which is not yet possible given the current state of the system) is tried over and over again.

If there are no more components to be executed, either because the system only has one developmental component or because it has been determined (in step 6) that there are no more components for which all required inputs are available, the method continues to step 7 in which the list of candidate repairs is filtered. Notably, the filtering process removes from the list those repairs that have already been executed with respect to the current input stimuli, but still led to failure. If there are candidate repairs left in the list then a selection is made of the one(s) with the highest estimated effectiveness: this repair is, or these repairs are, implemented (step 8). In theory, all candidate repairs in the filtered list could be implemented. However, it has been found from simulations that better results are achieved if only one repair, or a small set, is implemented at a time. Once the selected repair has been implemented, it is advantageous to restart the process at step 3, executing once again all components for which there are available inputs.

Although the restart could make use of the next batch of input stimuli available to the system, it has been found to be advantageous to restart the execution of components using the same input stimuli as before the repair. This has been found to speed up development considerably.

It may not always be desired or possible to restart the process at step 3 (for example, in an application where visual scenes and objects are to be handled, some objects may no longer be visible to the system by the time the repair has been executed). Accordingly, the system may be programmed such that the process restarts at step 2 following execution of repairs (possibly after an attempt to restart at step 3 has been found to be impossible).

If, after filtering the list of candidate repairs (step 7), none remain then the process is restarted from step 2, receiving a new batch of input stimuli and executing all components which are active for this set of inputs.

The process represented by FIG. 4 runs continuously during the operation phase. The operation phase will then give way to the shake-up phase. The duration of the operation phase could be set at a predetermined number of observation windows (that is, a predetermined number of time intervals). However, it is preferred for the changeover from the observation period to the shake-up period to be determined by the system performance, notably coming when a steady-state performance has been reached and there is no further significant increase in skill levels. The changeover to the shake-up phase can be triggered by a finding that the change in system performance from one observation window to the next and the change in skill levels from one observation window to the next have become small (e.g. compared to respective threshold levels). Alternatively or additionally, the changeover can occur when the system performance has been inadequate for a set number of observation windows and there is no significant increase in skill levels.

Shake Up Phase

The goal of the shake up phase is to adjust the challenge parameters. In most combinatorial optimisation algorithms (such as simulated annealing) this is done in a random fashion by arbitrarily selecting a parameter and changing it. By analogy, in the present invention a change in the parameter space can be generated by randomly selecting one or more of the challenge parameters in one or more components of the total system, and changing its value (increment or decrement). When using such an approach in systems according to the present invention, it has been found to be advantageous to initialize all challenge parameters to a low level at the start of development and to adopt a cautious strategy when changing the parameter space. Notably, it has been found to be preferable to change challenge parameters in one component of the system at a time. Moreover, it has been found to be advantageous to change just one challenge parameter at a time.

However, given the size of the parameter space for developmental systems of realistic complexity, the above-described search method is rather weak. Instead it is preferred to adopt an approach in which the challenge parameters are adapted in a more structured way, and available heuristics are exploited to the full extent. Such an approach is now described.

The shake up phase takes place after the system has sufficient experience with a given challenge parameter setting. "Sufficient experience" means that the average performance level of a component (or of each of the components in a multi-component system) and the total system no longer changes significantly during specific observation windows, and that there is no longer any significant increase in skill.

Two situations can now occur:

(1) Performance does not reach anywhere near the desired levels. This means that the challenge levels are too high and that learning is no longer improving performance. This can be designated the A-state (where A signifies "Anxiety"); or (2) Performance is consistently at a very high level. This means that operation of all components becomes routine and there is a potential for increased challenge. This state can be designated the B-state (where B signifies "Boredom").

It should be noted that, in many applications (such as natural language dialogues between autonomous agents) the complexity of the task addressed by a system depends also on the skill levels of a "partner". This means that the developing (or mature) system may sometimes need to decrease its own challenge levels in order to let the partner system catch up.

Depending on the specific state of the system, specific actions can be performed in order to stimulate development. Moreover a fine-grained analysis of these states is possible because performance for one component can be very high whereas that of another one can be very low. So changes to parameters are preferably heuristically guided by taking into account which components are in the A-state and which ones are in the B-state.

Another source of heuristic information is the dependency of components on each other. If a component is in the A-state, then this can be due to the complexity of the output coming from components that feed into it. Accordingly, it can be useful to propagate a "decrease challenge levels" signal to components that provide inputs to this component in the A-state (and this can be applied recursively, i.e. to decrease the challenge levels of components which provide inputs further "upstream" in the chain).

The final source of heuristic information is the performance that was achieved for the previous challenge parameter configuration. Advantageously, a record is kept of the performance achieved for previous challenge-parameter configurations. This enable the system to back-track, returning to an earlier configuration when it yields a better performance. This implements an iterated approach to work towards optimal configurations, based on a local exploration of the parameter space and hill climbing towards an adequate solution.

According to the present invention any or all of the above heuristics can be used to guide the strategy used for changing the challenge parameters during the shake-up phase. There will now be described a preferred strategy for changing the challenge parameters.

Procedure for the A-State

When it has been determined that a component is in the A-state, the following procedure is preferably adopted in order to decide which challenge parameters to decrease.

1. If the previous parameter configuration yielded a better overall system performance, M(s,t), than the current configuration, then first switch back to the earlier configuration before making any further change.

2. Generate a list of possible choices for parameter adaptation, as follows: for all components which are in the A-state, either one of the challenge parameters thereof could be decreased, or else one of the components feeding into it could be signalled to decrease the complexity of its output, by a recursive application of step 2. These choices can be heuristically ordered based on the performance of the components involved. More particularly, it should be preferred to change challenge parameters affecting a component that is currently performing relatively badly.

3. Choose one or more parameters from the list of possible choices, enact the change, and go back to the Operation Phase.

Procedure for the B-State

When it has been determined that a component is in the B-state, there is a steady performance with the given values for the challenge parameters but, perhaps, there is an opportunity for further increase in skill. Note that this phase corresponds to the 'randomisation' phase of many combinatorial optimisation algorithms, although the challenge-parameter change is not completely random. The following procedure is preferably adopted in order to decide which challenge parameters to increase.

1. Generate a list of possible choices for parameter adaptation, as follows: for all components which are in the B-state the possibilities are to increase one of the challenge parameters of this component, or else to recursively increase one of the challenge parameters that give input to this component. The possibilities can again be heuristically ordered based on the performance of the components involved.
2. Choose one or more of these parameters, enact the change, and go back to the Operation Phase.

Note that, preferably, a record is kept of parameter configurations and their associated performance, in order to backtrack if needed.

Initially changes to challenge parameters are large but then they are progressively made smaller in order to zoom in on the right settings. Research in simulated annealing suggests that it is advantageous for the sizes of the successive changes in the challenge parameter to follow a Boltzmann distribution. However, simulations have also shown that successful performance is possible for certain applications when the size of the change in the challenge parameters was kept at a constant, small value.

Experiments have shown that a conservative strategy (where only one repair is executed in the Operation Phase, and one parameter is changed in the Shake Up Phase) is much more desirable than drastic and rapid change.

EXAMPLES

Two examples of self-developing systems according to the present invention will now be described in order to illustrate the application of the above-described principles and procedures.

Example 1

A System Including a Single Self-Developing Component

Figure 5:
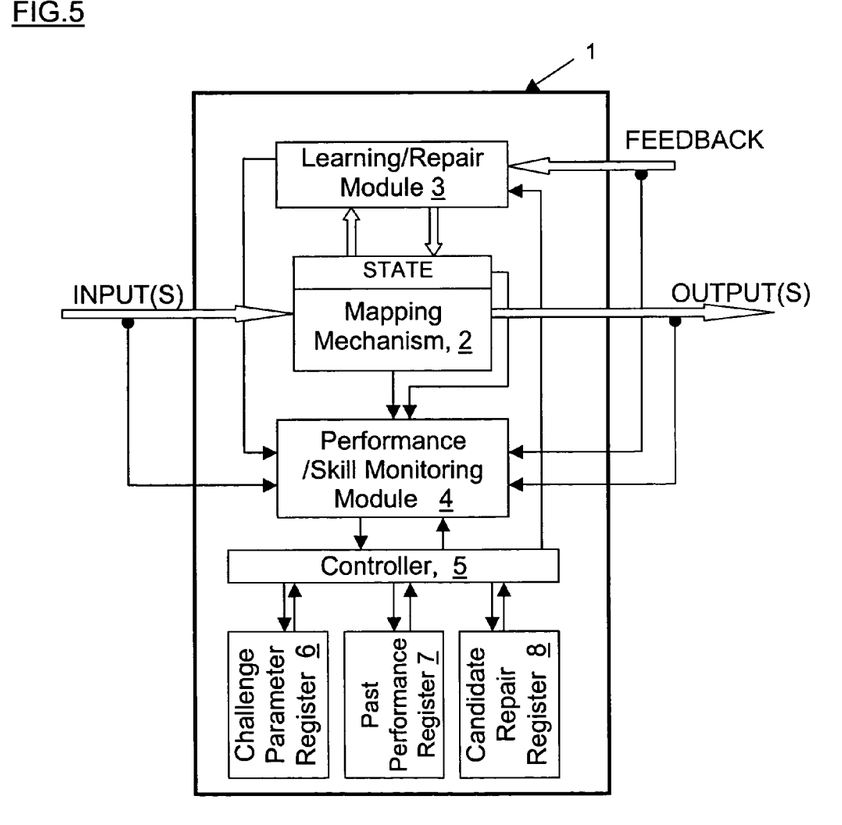
FIG. 5 is a block diagram schematically representing the main constituents of one example of a self-developing component using the autotelic principle to regulate its own development, in accordance with a first example of the present invention.

FIG. 5 is a block diagram indicating the main constituents of a single self-developing component 1 according to one embodiment of the present invention. In this example, to simplify the explanation, it is assumed that the self-developing component 1 forms part of an overall system in which it is the only self-developing component applying the autotelic principle. Other modules may be present, even other self-developing modules, but they do not apply the autotelic principle to drive their development.

As shown in FIG. 5, the self-developing component 1 includes a mapping mechanism 2, with an associated state, and a learning/repair module 3, which are generally similar to those of the known self-developing component shown in FIG. 1. The mapping mechanism 2 maps inputs to an output, and the learning/repair module 3 adapts the mapping performed by the mapping mechanism 2, based on feedback (both internal and external), in order to render the actual mapping closer to the desired mapping.

By way of contrast with known self-developing devices, the self-developing component 1 of FIG. 5 includes a module 4 for monitoring the performance and skill of this component with reference to a set of challenge parameters, p. The challenge parameters, p, represent the difficulty of the task that is being addressed by the self-developing component 1. Typically, these challenge parameters quantify any or all of the following:

the complexity of the inputs,
the complexity of the resources (e.g. time, space, memory, etc.) used by the mapping mechanism when implementing the task,
the complexity of the mapping function,
the complexity of the learning module,
the complexity of the feedback,
the complexity of the internal state associated with the mapping mechanism,
the complexity of the output.

To aid understanding, consider a self-developing component which converts expressions in standard predicate calculus into one or more words covering that expression. The input may take the form of an expression such as: red(O1), ball (O1), next-to (O1,O2), green (O2), box (O2), where red, ball, next-to, green and box are predicates and O1 and O2 are objects. The output could be the list of words {"red", "ball", "next-to", "green", "box"}.

The state of this component contains <predicate(s),word> pairs each having a respective score associated therewith. The mapping mechanism 2 selects for each predicate or subset of predicates the "best" word, i.e. the one having the highest score. If the selected word is "right", that is, a listener understands the word, this can produce a positive feedback signal causing the score associated with the selected <predicate(s), word> pair to be increased and those of competing pairs to be decreased. In this context "competing" <predicate(s),word> pairs are those having the same predicate but associated with a different word. If the selected word produces a failure (that is the listener did not understand the word), a failure signal is fed back to the component 1 and, as a result, the learning/ repair module 3 decreases the score associated with the <predicate(s),word> pair that was selected. In this case, the listener may suggest the correct word(s) and the component can store a new <predicate(s),word> pair.

In this example, the following challenge parameters may be defined:

$p_1$: the number of predicates given as input—intitially the component may accept only input expressions having a single predicate, progressing to expressions with several predicates, etc. This challenge parameter is related to the complexity of the input to the component 1.

$p_2$: the number of words produced as output—initially only single words are output (even if the input contains multiple predicates), then multiple words. Multiple words introduce a combinatorial search problem in the case of a failure, because it is no longer clear which word covers which meaning (but they can help to reduce the size of the lexicon). This challenge parameter is related to the complexity of the output from component 1.

$p_3$: the number of predicates in a <predicate(s),word> pair— there could be a single word for a single predicate or, alternatively, a single word may cover a large number of predicates. The latter possibility is needed in order to deal with the situation where the number of words used in the output is less than the set of predicates given as input. This challenge parameter is related to the complexity of the state associated with the mapping mechanism 3.

$p_4$: the number of alternative words that are stored for the same meaning—storing multiple alternatives allows the collection of statistical data about non-preferred word meanings which are active in the population but are not necessarily preferred by the current agent (assuming that this component forms part of an autonomous agent interacting with a population of other agents). This challenge parameter is related to the complexity of the learning/ repair module 3.

$p_5$: the size of the increment used for increasing or decreasing the score associated with a <predicate(s), word> pair— When this increment is small, the component will not be very adaptive to change. This causes the developing system to become more conservative (but also more reliable in performance). This challenge parameter is related to the complexity of the learning/repair module 3.

$p_6$: risk—either the <predicate(s), word> pair with the highest score is always used, or the system may occasionally select for use a pair with a lower score (in order to collect statistical data and improve the learning of this component. This challenge parameter is related to the complexity of the mapping function performed by the mapping mechanism 3.

$p_7$: multi-user—the system may use a varying number of tables storing scored <predicate(s), word> pairs. A single table could be used, or different tables could be stored for different listeners with which the system interacts (since different people may use words in slightly different ways). This challenge parameter is related to the complexity of the state associated with the mapping mechanism 3.

The details of the parameterisation depend obviously on the nature of the device and on the implementation technology that is used internally. For example, a neural network may initially ignore some of its input nodes, it may not use any memory of the past to decide on the present and then progressively integrate memory, it may initially use only some of its output nodes, it may only have a limited number of input-output links which then grow, it may receive a feedback signal for every output (supervised learning) or no feedback at all (unsupervised learning), it may use no layer between input and output or multiple layers, it may take a restricted number of time steps for computation or an indefinite number, etc.

The performance/skill monitoring module 4 of the self-developing component 1 typically monitors the component's own performance based on observing input, output, feedback and the internal use of resources (time, space, size and structural complexity of internal state). The details of means of implementing this monitoring also depend on the nature of the device and its implementation technology.

In use, the self-developing device 1 preferably goes through the above-described two phases: the operation phase and the shake up phase. Initially the challenge parameters are put at their lowest values and the device 1 is allowed to exercise itself in the operation phase (including learning to build up the internal "state"). At regular times, performance is evaluated and either steady performance or too weak performance may trigger the shake up phase. In the shake-up phase, there is a change to one of the challenge parameters (increase for steady performance, decrease for weak performance), re-initialisation of the performance monitors, and the operation phase starts again.

Example 2

A System Including a Set of Self-Developing Components

FIG. 7 is a block diagram indicating the main constituents of a multi-component self-developing system 11 according to another embodiment of the present invention. In this example, to simplify the explanation, it is assumed that all of the components in the system 11 are self-developing components applying the autotelic principle and the changing of challenge levels is controlled for the set of components taken together.

One example of a multi-component system in which the present invention can be applied is a natural language processing system. The natural language processing system includes autotelic components responsible for: perception, conceptualization, the lexicon, grammar, and rendering.

The perception component takes as its input a video stream and produces as its output logical expressions which constitute a description of an event present in the video stream. An implementation of such a component is described in "Shared grounding of event descriptions by autonomous robots" by L. Steels and J-C Baillie, Robotics and Autonomous Systems, 43 (2003), pp.163-173. The state of this component includes features extractors, object templates, and Markov models of events, all of which can expand through learning. Challenge parameters include: the duration of the window of observation, the number of objects that are tracked within the observation window, the certainty required for the recognition of an event/object or their features, the number of event types that can be handled, etc.

The conceptualization component selects one or more events and collects a series of predicates about the selected event(s)/object(s) that are distinctive. This component has many different challenge parameters, including: the number of events chosen, how different they have to be from the past, the number of objects included in the event description, whether other aspects such as time/causality are expressed, etc. This component has many opportunities for increasing skill, for example, by increasing memory resources to keep better track of what has been chosen in the past, by expanding the repertoire of distinctions, etc.

The lexicon component can operate as described above, and produces a string of words covering the predicates in the event description.

The grammar component uses grammatical rules to impose ordering (or other syntactic structuring) on words coming from the lexicon. This component can also be adaptive in the sense that it learns new grammatical rules so as to be able to handle new words or new types of constructions. The challenge parameter of this component is particularly related to how much ambiguity needs to be avoided.

The rendering component extracts an utterance from the syntactic structure produced by the grammar component.

It is to be understood that the present invention can be applied in a system in which the regulation of challenge levels is handled separately for each component (such that the system equates to a set of components 1 of FIG. 5). Furthermore, the invention can be applied in a "mixed" system wherein only some components apply the autotelic principle to drive development (with challenge levels being regulated either for this set of components taken together as in system 11 of FIG. 7, or for each of this set of components separately as for a set of components 1 of FIG. 5).

Moreover, FIG. 7 represents a system in which the self-developing components are chained in a simple manner such that the output from a first self-developing component $c_1$ serves as one of the inputs for the second component $c_2$ (the other inputs to $c_2$ not being shown), the output from the second self-developing component $c_2$ serves as one of the inputs for the third component $c_3$, (the other inputs to $c_3$ not being shown), etc. The output from the final self-developing component in the chain, $c_n$, serves as the output from the system 11. It is to be understood that the present invention can be applied irrespective of the particular geometry in which the components are chained.

In FIG. 7 it is shown that each autotelic component $c_i$ receives feedback (which indicates how well this component $c_i$ is performing its allocated task/the overall system is performing). This feedback can come from another of the components $c_i$, from outside the system, and/or from within the component 1 itself.

Each of the self-developing components $c_i$ includes a mapping mechanism 2 having an associated state, and a learning/repair module 3 controlling the adaptation of the mapping mechanism 2 in order to modify the mapping performed thereby. Each self-developing component also includes a performance/skill monitoring module 4. The overall system 11 also has a performance/skill monitoring module 9 evaluating one or more performance measures, m, for the overall system (considered as a component in its own right).

In the self-developing system 11 of this example, the regulation of challenge parameters within all of the components $c_1$ to $c_n$ (and the overall system, considered as a component $c_T$) is controlled by a single controller 5, with an associated challenge parameter register 6, past-performance register 7 and candidate repair register 8.

The preferred method for controlling the growth of complexity in the system 11 is, as follows. When the system 11 starts to learn, the controller 5 sets the challenge parameters for all of the components c to low levels. Then the system is allowed to run in the "operation phase". The system 11 has applied thereto a first set of inputs. Components c for which all required inputs are available are allowed to implement their respective mapping functions, one by one (as in steps 3 to 8 of FIG. 4). When failures occur, a list of possible repairs associated with the "failing" component is generated: this can be based on data stored in the learning/repair module 3, performance/skill monitoring module 4 or a separate memory (not shown) for this component c, or on data stored in the controller 5 or in a memory or register associated therewith (not shown). The "repair" data (and any ranking associated therewith) can be adaptive. The possible repairs are added to a list of "candidate repairs" held in the candidate repair register 8 associated with the controller 5.

Once all active components have been executed, the repair list is filtered (see step 7 of FIG. 4) and, if any remain, it is preferred to execute a single one of the remaining repairs. The selected repair (which may be chosen based on a stored parameter indicating the expected effectiveness of this repair) is implemented by virtue of the controller 5 sending an appropriate control signal to the learning/repair module 3 of the component in question. The learning/repair module 3 of that component then implements the necessary repair (for example, it may increase the amount of memory available to its associated mapping mechanism 2). After the repair has been performed, it is preferred to maintain the current batch of inputs and once again execute all active components, one-by-one. If there are no available repairs, or none of the components that are active for the current set of input stimuli have produced failures, the next batch of input stimuli is applied to the system 11.

During the above-described operation phase, the performance of the system as a whole and of the components (and the associated skill levels), will increase. In each of a succession of observation windows (time intervals), the performance of each component is monitored, as well as the performance of the total system. During each observation window, the procedure represented by the flow chart of FIG. 4 will run several times. At the end of each observation window, the controller 5 calculates the "cost" function $C(P(s,t))$ associated with the current challenge parameter settings and skill levels, based on the observed system performance $M(s,t)$.

The operation phase is continued until the controller 5 determines that the improvement in system performance, $M(s,t)$, from one observation window to the next is smaller than a certain threshold value (this threshold value can be modified by the system, based on experience) and skill levels are not increasing to any significant extent. Then the controller 5 initiates the "shake-up phase" described above. The controller 5 determines, based on signals from the performance/skill modules 4 of the various components, and the current values of the challenge parameters (stored in the challenge parameter register 6) which components are in the "A-state", and which are in the "B-state". The controller 5 interrogates the past-performance register 7 to check whether the current system performance is better or worse than that achieved with the previous setting (or, generally, an earlier setting) of challenge parameters. Based on these findings, and stored heuristics (which, in the current embodiment, are pre-programmed), the controller 5 selects one or more challenge parameters to have an increase or decrease in value. As mentioned above, it has been found to be advantageous to increase or decrease just one challenge parameter value in each instance of the shake-up phase.

The changed challenge parameter will relate to one (or possibly more) of the components c of the system 11 and will affect at least one performance measure calculated for that component c by its performance/skill monitoring module 4. Accordingly, the controller 5 sends a notification of the changed challenge parameter value(s) to the relevant performance/skill monitoring module(s) 4. The system goes back into the operation phase, based on the updated challenge parameter values.

The self-developing systems according to the present invention have a wide variety of applications. Their application in natural language processing systems has already been mentioned above, as has their application in sensori-motor devices such as robotic grasping devices. It is to be understood that the present invention is applicable in general to artificial systems including at least one self-developing component.

Although various preferred embodiments of the present invention have been described above, it is to be understood that these are for the purposes of illustration only. Numerous modifications to these specific embodiments, within the scope of the present invention as defined in the accompanying claims, will readily occur to the person skilled in the art.

Figure 6:
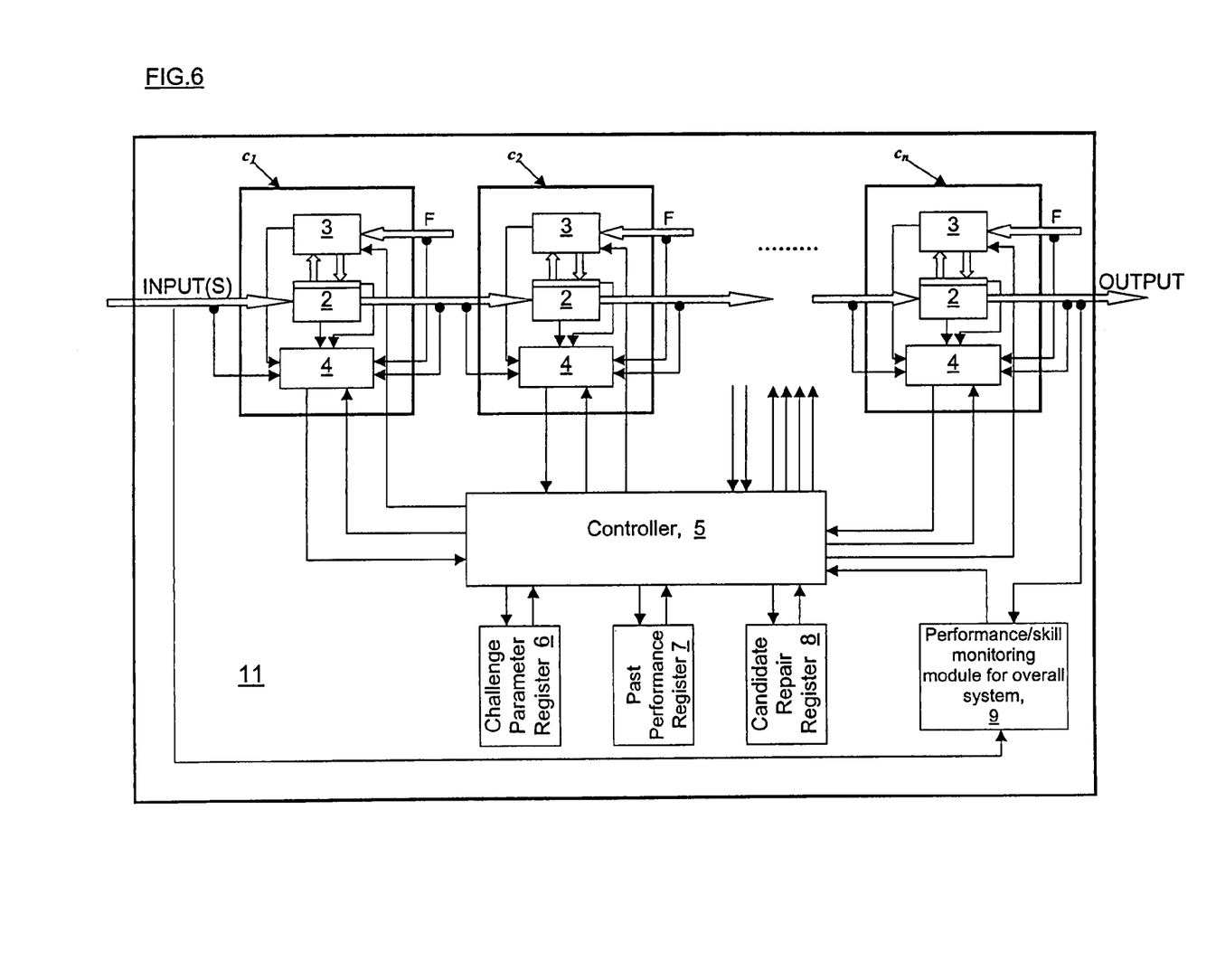
FIG. 6 is a block diagram indicating the main constituents of one example of a multi-component self-developing system using the autotelic principle to regulate its own development, in accordance with a second example of the present invention.

For example, although in FIGS. 5 and 6 various modules of the self-developing components 1 according to the present invention are represented as discrete units (e.g. the mapping mechanism 2, learning/repair module 3, performance/skill monitoring module 4 and the controller 5) the functions of these modules may be combined in one or more common devices, depending upon the implementation. Moreover, some or all of these modules may actually be implemented in software. Additionally, although separate registers are shown for the challenge parameters, the record of past-performance and the candidate repairs list, this is merely for the purpose of illustration. Different memory arrangements can be used for storing these various items of data, either separately, or in a common storage means (which can be internal to, or external from, the controller 5).

Furthermore, although in FIG. 6 each autotelic component $c_i$ of the system 11 is shown as including a respective module 4 for monitoring performance/skill of that component $c_i$, it is to be understood that the performance/skill of the various components could be monitored by one or more modules provided outside the individual components $c_i$ and associated with the controller 5.

Finally, the performance/skill monitoring module 4 can be integrated into the controller 5.

The invention claimed is:

1. A self-developing artificial device, wherein the process of development of said self-developing artificial device is driven by a requirement to achieve a performance level which matches a changeable level of challenge set by the device itself, wherein said self-developing artificial device has a mapping mechanism which applies a mapping function to a set of one or more inputs in order to produce one or more outputs, the device further comprising:
   a controller for generating a set of one or more challenge parameters defining criteria to be satisfied by said self-developing device when performing a task, wherein the controller functions in an operation phase and a shake-up phase, and holds said set of challenge parameters unchanged during a respective instance of the operation phase and, during each instance of the shake-up phase, selects and alters the value of one or more challenge parameters of said set;
   performance monitoring means for monitoring, during each of a series of time intervals, the performance of said task by said self-developing device and evaluating the extent to which the performance satisfies the criteria defined by the set of challenge parameters generated by said controller; and
   a learning module for adapting the mapping function applied by said self-developing device, based on the performance monitored by the performance monitoring means to control the self-developing device to match the performance of said self-developing device to said criteria defined by said set of challenge parameters.

2. The self-developing artificial device according to claim 1, wherein, in use, when the performance monitoring means detects a difference, greater than a threshold amount, between the actual performance of said self-developing device and a performance level indicated by the set of challenge parameters then said performance monitoring means generates a failure signal and, in response to the generation of a failure signal, the controller instructs the learning module to implement a set of one or more repairs selected in a list of candidate repairs, if available.

3. The self-developing artificial device according to claim 2, wherein, in use, in response to the generation of a failure signal, the controller instructs the learning module to implement a respective single repair.

4. The self-developing artificial device according to claim 2, wherein, in use, the controller filters out from the list of candidate repairs any repairs which have previously been tried unsuccessfully.

5. The self-developing artificial device according to claim 2, wherein, in use, after the controller has instructed the learning module to implement said set of one or more repairs said self-developing device attempts to apply the mapping function thereof to the same set of inputs as that which provoked generation of the failure signal motivating the repair(s).

6. The self-developing artificial device according to claim 2, wherein the value of each challenge parameter in said set is indicative of a level of complexity.

7. The self-developing artificial device according to claim 6, wherein each challenge parameter is defined to take values within a range of 0.0 to 1.0, with 1.0 representing the greatest level of complexity.

8. The self-developing artificial device according to claim 7, wherein at start-up of development the controller sets values for the challenge parameters at a low end of their respective ranges.

9. The self-developing artificial device according to claim 2, wherein the controller changes over from functioning in the operation phase to functioning in the shake-up phase when it is determined that the change in performance levels of said self-developing device from one time interval to the next is less than a threshold amount.

10. The self-developing artificial device according to claim 2, wherein a set of one or more skill variables ($<s_1, s_2, \ldots, s_r>$) is defined for said self-developing device, the value of each skill variable(s) quantifying a respective capability of, or resource used by, the self-developing device, and the controller changes over from functioning in the operation phase to functioning in the shake-up phase when it is determined that the changes in performance levels and skill levels of said self-developing device from one time interval to the next are less than respective threshold amounts.

11. The self-developing artificial device according to claim 2, wherein the controller changes a single challenge parameter, or a small number of challenge parameters, during each instance of the shake-up phase.

12. A system comprising a plurality of agents each agent being the self-developing artificial device according to claim 2, wherein, in use, when a first one of said self-developing devices is unable successfully to process an output produced by a second one of said self-developing devices said first self-developing device can generate a failure signal in respect of a component of said second self-developing device.

13. A self-developing artificial apparatus comprising:
   a plurality of self-developing modules, wherein each module has a mapping mechanism which applies a mapping function to a set of one or more inputs in order to produce one or more outputs;
   a controller for generating a set of one or more challenge parameters defining criteria to be satisfied by at least one of said modules when performing a task, wherein the controller functions in an operation phase and a shake-up phase, and holds said set of challenge parameters unchanged during a respective instance of the operation phase and, during each instance of the shake-up phase, selects and alters the value of one or more challenge parameters of said set;
   performance monitoring means for monitoring, during each of a series of time intervals, the performance of said task by said at least one module and evaluating the extent to which the performance satisfies criteria defined by the set of challenge parameters generated by said controller; and
   a learning module for adapting the mapping function applied by said at least one module, based on the performance monitored by the performance monitoring means, to control the at least one component to match the monitored performance of said at least one module to said criteria defined by said set of challenge parameters, and
   wherein, during the shake-up phase, the controller selects said set of one or more challenge parameters for change based on monitored performance data (M) for said plurality of self-developing modules and for the apparatus as a whole.

14. The self-developing artificial device according to claim 13, wherein, in use, when a first one of said self-developing modules is unable successfully to implement its mapping function said first self-developing module can generate a failure signal in respect of a second one of said self-developing modules whose output serves as an input to said first self-developing module.

15. A system comprising a plurality of agents, each agent being the autonomous self-developing artificial apparatus according to claim 13, wherein, in use, when a first one of said self-developing apparatuses is unable successfully to process an output produced by a second one of said of self-developing apparatuses, said first self-developing apparatus can generate a failure signal in respect of a component of said second self-developing apparatus.

16. A method of self-regulating development of an artificial system comprising at least one self-developing artificial device by driving said device to achieve a performance level which matches a changeable level of challenge set by the device itself in which said device has a mapping mechanism which applies a mapping function to a set of one or more inputs in order to produce one or more outputs, the method comprising:
generating a set of one or more challenge parameters defining criteria to be satisfied by said self-developing device when performing a task, said generating including an operation phase and a shake-up phase, said set of challenge parameters being held unchanged during each instance of the operation phase, and during each instance of the shake-up phase there are provided the steps of selecting and altering the value of one or more challenge parameters of said set;
during each of a series of time intervals, monitoring the performance of said task by said self-developing device and evaluating the extent to which the performance satisfies the criteria defined by said set of challenge parameters; and
adapting the mapping function applied by said self-developing device, based on the performance monitored by the performance monitoring means, to control the self-developing device to match the performance of said self-developing device to said criteria defined by said set of challenge parameters.

17. The method according to claim 16 of self-regulating development of the self-developing device, the method further comprising:
generating a failure signal in respect of a component when there is a difference, greater than a threshold amount, between the actual performance of said self-developing device and a performance level indicated by the set of challenge parameters, and
implementing a set of one or more repairs, if available, selected in a list of candidate repairs, on the self-developing device in response to the generation of a failure signal.

18. The method according to claim 17 of self-regulating development of the self-developing device, the method further comprising:
implementing a single repair in response to the generation of a respective failure signal.

19. The method according to claim 17, of self-regulating development of the self-developing device, said method further comprising:
filtering out from the list of candidate repairs any repairs which have previously been tried unsuccessfully for said self-developing device.

20. The method according to claim 17, of self-regulating development of the self-developing device, said method further comprising:
attempting to re-apply the mapping function to the same set of inputs as that which provoked generation of the failure signal motivating the repair(s).

21. The method according to claim 16, of self-regulating development of the self-developing device, wherein each challenge parameter is defined to take values within a range of 0.0 to 1.0, with 1.0 representing the greatest level of complexity.

22. The method according to claim 21, of self-regulating development of the self-developing device wherein at start-up of device development the values set for the challenge parameters are at a low end of their respective ranges.

23. The method according to claim 16, of self-regulating development of the self-developing device, wherein the generating changes over from the operation phase to the shake-up phase when it is determined that the change in performance levels of said self-developing device from one time interval to the next is less than a threshold amount.

24. The method according to claim 16, of self-regulating development of the self-developing device, further comprising:
defining a set of one or more skill variables ($<s_1, s_2, \ldots, s_r>$) for the self-developing device, the value of each skill variable(s) quantifying a respective capability of, or resource used by, the device, wherein the generating changes over from functioning in the operation phase to functioning in the shake-up phase when it is determined that the changes in performance levels and skill levels of said self-developing device from one time interval to the next are less than respective threshold amounts.

25. The method according to claim 16, of self-regulating development of the self-developing device wherein during each instance of the shake-up phase a single challenge parameter, or a small number of challenge parameters, is selected and has the value thereof changed.

26. A method of self-regulating development of a self-developing artificial apparatus including a plurality of self-developing modules ($c_i$), wherein each module has a mapping mechanism which applies a mapping function to a set of one or more inputs to produce one or more outputs, the method comprising:
generating a set of one or more challenge parameters defining criteria to be satisfied by at least one of said self-developing devices when performing a task, said generating including an operation phase and a shake-up phase, said set of challenge parameters being held unchanged during each instance of the operation phase, and during each instance of the shake-up phase there are provided the steps of selecting and altering the value of one or more challenge parameters of said set;
during each of a series of time intervals, monitoring the performance of said task by said self-developing device and evaluating the extent to which the performance satisfies criteria defined by said set of challenge parameters; and
adapting the mapping function applied by said at least one self-developing device, based on the performance monitored by the performance monitoring means, to control the self-developing device to match the performance of said self-developing device to said criteria defined by said set of challenge parameters,
wherein during the shake-up phase, said set of one or more challenge parameters is selected for change based on monitored performance data (M) for said plurality of self-developing components and for the system as a whole.

27. The method according to claim 26 of self-regulating development of the self-developing artificial apparatus comprising a plurality of self-developing modules ($c_i$), wherein, when a first one of said self-developing modules is unable successfully to implement its mapping function said first self-developing module can generate a failure signal in respect of a second one of said self-developing modules whose output serves as an input to said first self-developing module.

* * * * *